Feb. 15, 1927.
A. L. ROEBUCK
1,618,137
STEERING WHEEL
Filed April 17, 1926
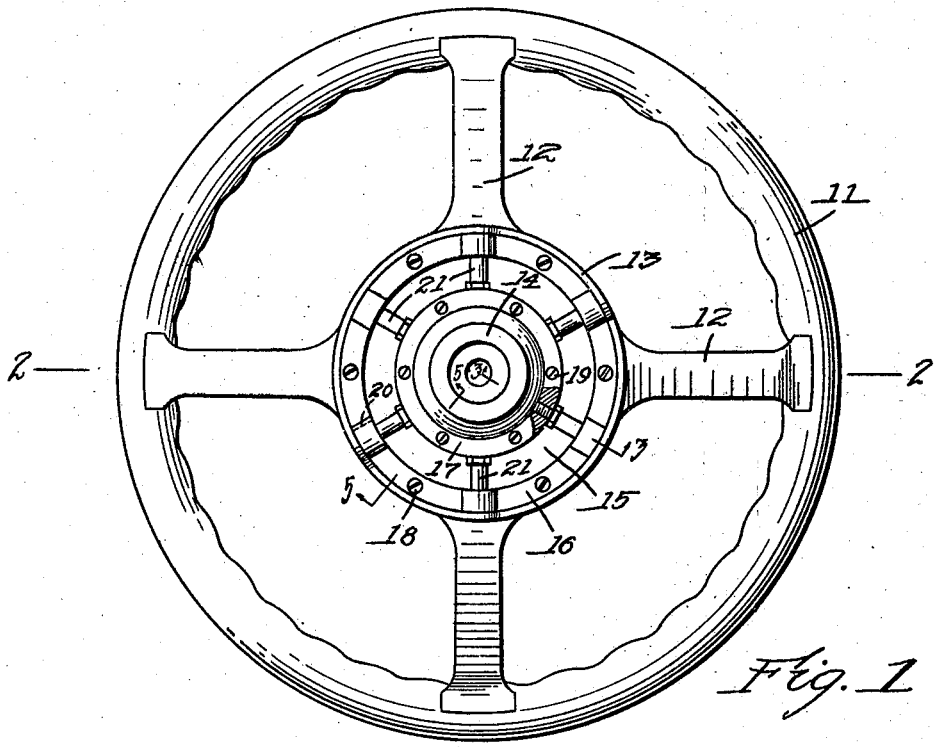
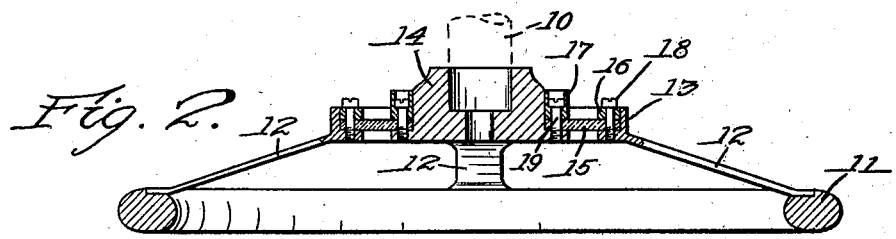
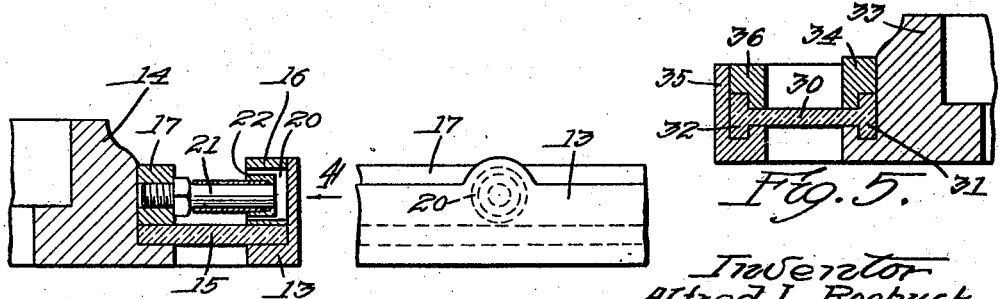
Inventor
Alfred L. Roebuck
By Attorneys
Southgate Fay & Hawley Patented Feb. 15, 1927.

1,618,137

UNITED STATES PATENT OFFICE.

ALFRED L. ROEBUCK, OF WINCHENDON, MASSACHUSETTS.

STEERING WHEEL.

Application filed April 17, 1926. Serial No. 102,753.

This invention relates to a steering wheel particularly designed for use in an automobile, but also capable of application in motor-boats, aeroplanes and for other general purposes.

The object of the invention is to provide a steering wheel which is so constructed that it will absorb the engine vibrations and road shocks, thus being conducive to the comfort and enjoyment of the operator.

My invention further relates to arrangements and combinations of parts which will be hereinafter described and more particularly pointed out in the appended claims.

Preferred forms of the invention are shown in the drawings in which—

Fig. 1 is a bottom view of my improved steering wheel;

Fig. 2 is a sectional side elevation, taken along the line 2—2 in Fig. 1;

Fig. 3 is an enlarged detail sectional view, taken along the line 3—3 in Fig. 1;

Fig. 4 is a detail side elevation, looking in the direction of the arrow 4 in Fig. 3; and Fig. 5 is a detail sectional view, taken along the line 5—5 in Fig. 1 and showing a slight modification.

Referring to the drawings, I have shown my improved steering wheel as secured to the end of a steering post or shaft 10 and comprising a rim 11 connected by arms 12 to an intermediate ring 13. A hub 14 is secured to the post 10 in any convenient manner and is connected to the ring 13 by a flat annular plate 15 of suitable resilient material, preferably sheet rubber. The ring 13 and the hub 14 are provided with suitable annular recesses to receive the resilient disc 15, and the disc is firmly secured in the recesses by clamping rings 16 and 17, suitably secured by screws 18 and 19.

With this construction the rim 11 is flexibly connected with the hub 14 and with the steering post 10, and the engine vibrations and road shocks are almost completely absorbed, so that practically no vibration is felt by the operator.

While the construction thus far described serves admirably for absorbing the shocks and vibration, it permits too great displacement of the steering wheel rim, if an exceptionally heavy strain is placed thereon.

Accordingly, I have provided means for limiting the extent to which the rim may yield relatively to the hub. For this purpose I provide openings 20 in the ring 16 and studs 21 threaded in the hub ring 17 and extending loosely into the openings 20.

A rubber sleeve or cushion 22 is secured around each stud 21 and also fits loosely in the corresponding opening 20. The studs and openings are angularly spaced about the hub 14, six such studs and openings being shown in the drawings.

With this construction, the rim 11 is left free for slight movements by which road shock and engine vibration may be absorbed, but at the same time the rim is held from substantial displacement, either angularly or in a direction along the steering post.

When the rim is displaced to the extent in which it is limited by the studs 21, the bushings or cushion sleeves 22 act to absorb additional vibrations and prevent direct rigid contact between the rim and hub. At the same time, sudden or unusual pressure may be applied to the wheel without causing substantial displacement of the rim relatively to the steering post.

In Fig. 5 I have shown a slight modification in which the resilient ring or disc 30 is provided with annular flanges 31 and 32 at its inner and outer edges respectively. The flange 31 is received in suitable annular recesses in the hub 33 and clamping ring 34, and the flange 32 is received in corresponding recesses in the ring 35 and clamping ring 36. This construction anchors the disc somewhat more firmly in the hub and rim portions and under certain conditions this is an advantage over the form previously described.

The centering and limiting studs 21 are to be used with this form of the invention, exactly as previously described.

Having thus described my invention and the advantages thereof, I do not wish to be limited to the details herein disclosed, otherwise than as set forth in the claims, but what I claim is:

1. A steering wheel comprising a rigid hub portion, a rigid annular handle portion, and a resilient annular member yieldingly connecting said handle and hub portions.

2. A steering wheel comprising a rigid hub portion, a rigid annular handle portion, a resilient annular connecting member, and means to clamp the inner and outer edge portions of said resilient member to said hub portion and to said handle portion respectively.

3. A steering wheel comprising a rigid hub portion, a rigid annular handle portion, and a flat ring of heavy rubber fabric secured at its inner edge to said hub portion and at its outer edge to said handle portion.

4. A steering wheel comprising a rigid hub portion, a rigid annular handle portion, a flat ring of resilient material having thickened inner and outer edge portions, and clamping devices for said ring on said hub and handle portions, said clamping devices having recesses to receive said thickened edges.

5. A steering wheel comprising a rigid hub portion, a rigid annular handle portion, a resilient annular member yieldingly connecting said handle and hub portions, and means to prevent substantial displacement of said handle portion relative to said hub portion.

6. A steering wheel comprising a rigid hub portion, a rigid annular handle portion, a resilient annular member yieldingly connecting said handle and hub portions, and means to limit circumferential displacement of said handle portion relative to said hub portion.

7. A steering wheel comprising a rigid hub portion, a rigid annular handle portion, a resilient annular member yieldingly connecting said handle and hub portions, and means to prevent tilting displacement of said handle portion relative to said hub portion.

8. A steering wheel comprising a rigid hub portion, a rigid annular handle portion, a resilient annular member yieldingly connecting said handle and hub portions, and means to prevent substantial displacement of said handle portion relative to said hub portion, said means comprising a plurality of studs secured in one of said portions, and the other portion having corresponding recesses to loosely receive said studs.

9. The combination in a steering wheel as set forth in claim 8, in which cushion members are provided between said studs and the walls of said recesses.

10. A steering wheel comprising a rigid hub portion, a rigid annular handle portion, and means permitting limited circumferential and tilting movements of said handle portion relative to said hub portion.

In testimony whereof I have hereunto affixed my signature.

ALFRED L. ROEBUCK.